(12) United States Patent
Sauermann

(10) Patent No.: US 7,725,900 B2
(45) Date of Patent: May 25, 2010

(54) METHOD OF ASSIGNING OBJECTS TO PROCESSING UNITS

(75) Inventor: Volker Sauermann, Dossenheim (DE)

(73) Assignee: SAP AG, Walldorf (DE)

( * ) Notice: Subject to any disclaimer, the term of this patent is extended or adjusted under 35 U.S.C. 154(b) by 805 days.

(21) Appl. No.: 10/567,606

(22) PCT Filed: Jul. 20, 2004

(86) PCT No.: PCT/EP2004/008103

§ 371 (c)(1),
(2), (4) Date: Dec. 21, 2006

(87) PCT Pub. No.: WO2005/015402

PCT Pub. Date: Feb. 17, 2005

(65) Prior Publication Data

US 2007/0162629 A1    Jul. 12, 2007

(30) Foreign Application Priority Data

Aug. 8, 2003    (EP) .................................. 03018101

(51) Int. Cl.
G06F 9/46    (2006.01)
G06F 9/26    (2006.01)
(52) U.S. Cl. ...................................... 718/105; 711/200
(58) Field of Classification Search ................. 718/105; 711/200
See application file for complete search history.

(56) References Cited

U.S. PATENT DOCUMENTS

| | | | |
|---|---|---|---|
| 6,216,216 B1 * | 4/2001 | Bonola | 712/28 |
| 7,117,294 B1 * | 10/2006 | Mi et al. | 711/101 |
| 2002/0016785 A1 * | 2/2002 | Sirgany | 706/46 |
| 2002/0046316 A1 | 4/2002 | Borowsky et al. | |
| 2003/0105903 A1 * | 6/2003 | Garnett et al. | 710/300 |
| 2004/0054780 A1 * | 3/2004 | Romero | 709/226 |

OTHER PUBLICATIONS

Janos Csirik & Gerhard J. WoegingerOn-line Packing and Covering Problems, Published 1998, pp. 147-172.*
William Leinberger et al., "Multi-Capacity Bin Packing Algorithms with Applications to Job Scheduling under Multiple Constraints," retrieved from the Internet: http://www.users.cs.umn.edu/{karypis/publications/Papers/PDF/mrbinpack.pdf, May 27, 1999, pp. 1-23.
E. G. Coffman, Jr. et al., "Approximation Algorithms For Bin Packing: A Survey," Approximation Algorithms for NP-Hard Problems, retrieved from the Internet: http//www.ee.columbia.edu/{egc/webpapers/BPchapter.ps, 1996, pp. 1-53.
"Relational Assignments for Distributed Database Systems," IBM Technical Disclosure Bulletin, IBM Corp., New York, vol. 31, No. 1, Jun. 1, 1988, pp. 219-225.

(Continued)

*Primary Examiner*—Meng-Ai An
*Assistant Examiner*—Douglas Bryant
(74) *Attorney, Agent, or Firm*—Finnegan, Henderson, Farabow, Garrett & Dunner LLP

(57) ABSTRACT

Methods and systems for assigning objects to processing units of a cluster of processing units are provided. In one implementation, the objects to be assigned may be sorted by size, which provides a sequence of objects. Starting with the first processing unit, objects may then be assigned in sequential order. This way the loading of the processing units may be balanced.

19 Claims, 20 Drawing Sheets

OTHER PUBLICATIONS

Eric Jui-Lin Lu et al., "An Efficient Load Balancing Technique for Parallel FMA in Message Passing Environment," Proceedings of the Eighth SIAM Conference on Parallel Processing for Scientific Computing, retrieved from the Internet: http://www.cyutedu.tw/{jlu/research/parallel/nbody/siam97.ps, Mar. 1997, pp. 1-8.

Gagan Aggarwal et al., "The Load Rebalancing Problem," Proceedings of the Fifteenth Annual ACM Symposium on Parallel Algorithms and Arthitectures, Jun. 2003, pp. 258-265.

PCT International Search Report, mailed Nov. 5, 2004 (3 pages).

* cited by examiner

Blade 1: Tables 20, 12
Blade 2: Tables 15, 6, 2, 13, 14
Blade 3: Tables 1, 7
Blade 4: Tables 5, 19
Blade 5: Tables 4, 17
Blade 6: Tables 16, 9
Blade 7: Tables 10, 18, 3
Blade 8: Tables 8, 11

Blade 1: Tables 20, 6
Blade 2: Tables 15, 2, 13, 14
Blade 3: Tables 1, 12
Blade 4: Tables 5, 7
Blade 5: Tables 4, 18
Blade 6: Tables 16, 9
Blade 7: Tables 10, 17
Blade 8: Tables 8, 19, 3, 11

Blade 1: Tables 20, 13, 14
Blade 2: Tables 15, 2
Blade 3: Tables 1, 6
Blade 4: Tables 5, 3
Blade 5: Tables 4, 18
Blade 6: Tables 16, 8
Blade 7: Tables 10, 17
Blade 8: Tables 9, 19, 7, 11, 12

Blade 1: Tables 20, 6
Blade 2: Tables 15, 2, 13, 14
Blade 3: Tables 1, 12
Blade 4: Tables 5, 7
Blade 5: Tables 4, 18
Blade 6: Tables 16, 9
Blade 7: Tables 10, 17
Blade 8: Tables 8, 19, 3, 11

METHOD OF ASSIGNING OBJECTS TO PROCESSING UNITS

RELATED APPLICATIONS

This application is a national stage filing under 35 U.S.C. §371 of International Application No. PCT/EP2004/0008103, filed on Jul. 20, 2004, which published in the English language and claims the benefit of priority to European Application No. 03018101.0, filed Aug. 8, 2003.

FIELD OF THE INVENTION

The present invention generally relates to the field of data processing. More particularly and without limitation, the invention relates to methods and systems related to object size balancing in a multi-computing environment.

BACKGROUND

Various multi-computing architectures are known where a plurality of processing units are coupled to form a cluster. Such architectures are used in parallel processing and also in the emerging field of blade computing.

Blade computing relies on blade servers, which are modular, single-board computers. An overview of blade computing is given in "Architectures and Infrastructure for Blade Computing", September 2002, Sun Microsystems and "THE NEXT WAVE: BLADE SERVER COMPUTING", Sun Microsystems.

A content load balancing blade is commercially available from Sun Microsystems, for example, the Sun Fire™ B10n. This blade provides traffic and content management functionalities. Content load balancing is achieved based on URLs, CGI scripts and cookies. Server load balancing is achieved based on server loads, response times, and weighted round-robin algorithms.

US patent application no. 20030105903 shows a web edge server, which comprises a number of blade servers. A switch and an information distribution module are provided for the purpose of balancing. The information distribution module receives an information message, performs processing on the message to determine a destination, and forwards a message toward the determined destination via an internal communications network.

SUMMARY OF THE INVENTION

Methods and systems consistent with the present invention are provided for a method of assigning objects to processing units of a cluster of processing units. Each one of the processing units has a certain storage capacity. For the purpose of balancing the sizes of objects of the individual processing units, a given number of objects needs to be distributed. This is accomplished by sorting of the objects by size, which provides a sequence of objects. This sequence is used for assigning of objects to processing units.

In accordance with one embodiment of the invention, the procedure for assigning of objects to a processing unit, starts with the largest object of the sequence and continues until the remaining storage capacity of the processing unit is below the size of the smallest remaining object of the sequence. When this condition is fulfilled, the procedure is carried out again for the next processing unit, whereby the objects which have been previously assigned, are deleted from the sequence. This way a minimum number of processing units, which are required for handling a given set of objects can be determined.

In accordance with another embodiment of the invention, each processing unit is a single-board computer that has a bus interface to a bus system that couples a plurality of the single-board computers. Each of the single-board computers may include private processing and data storage resources. Data processing tasks or sub-tasks of a complex data processing task are assigned to the single-board computers by a control unit. The control unit can be a separate hardware unit or a software process that runs on one of the single-board computers. An example of such a distributed data processing system is a cluster of blades.

In accordance with another embodiment of the invention, the remaining storage capacity of a processing unit is determined by the difference between the storage capacity of the unit and the aggregated size of objects, which have been assigned to the processing unit. On the basis of this definition of the remaining storage capacity, the minimum number of processing units is determined.

In accordance with a further embodiment of the invention, the object size balancing procedure is performed again in order to further improve the object size balancing. For this purpose the largest gap between the aggregated sizes of objects being assigned to one of the processing units and the maximum storage capacity is determined.

This gap is divided by the minimum number of processing units and the result of the division is subtracted from the maximum storage capacity to provide a threshold level. When the procedure for assigning the objects to the processing units is performed again, the definition of the remaining storage capacity is the difference between the aggregated size of the objects being assigned to the processing unit and the threshold level. As a result of the renewed performance of the assignment procedure, the gap can be substantially reduced.

In accordance with a further embodiment of the invention, the theoretical storage capacity limit for a perfectly evenly distributed load is used as a threshold. This threshold is obtained by calculating the difference between the total of the storage capacities of the processing units and the total of the sizes of the objects and dividing the difference by the minimum number of processing units. The result of the division is subtracted from the storage capacity, which provides the theoretical limit.

The assignment procedure is performed again, whereby the remaining storage capacity is defined as the difference between the aggregated size of the objects of a processing unit and the threshold. Typically the storage capacity of the last processing unit of the minimum number of processing units, to which the objects are assigned in the procedure, will not be sufficient to accommodate all of the remaining objects of the sequence.

In this case one or more iterations are performed. For one iteration the excess amount of memory is divided by the minimum number of processing units. The result of the division is added to the threshold and the assignment procedure is performed again. This process continues until the storage capacity of the last processing unit, to which the remaining objects of the sequence are assigned in the procedure, is sufficient to accommodate all these objects. This way, the object size balancing may be further improved.

In accordance with a further embodiment of the invention, the threshold for performing the assignment procedure is varied between the theoretical limit and the storage capacity. For each value of the threshold, a new assignment procedure is performed. For each of the assignments of objects to processing units, a statistical measure is calculated. This statistical measure is a basis to select one of the assignments for optimal object size balancing.

In accordance with a further embodiment of the invention the standard deviation or variance of the sum of the object sizes assigned to a processing unit is used as a statistical measure. The standard deviations obtained for the processing units as a result of the assignment procedure are stored as an overall quality measure of the assignment. The assignment having the lowest overall quality measure is selected.

In accordance with a further embodiment of the invention, each one of the processing units is a blade or a blade server. One of the blades can have a program, which implements the principles of the present invention, in order to perform object size balancing. This way the number of swap-operations between the blades can be minimized.

In accordance with a further embodiment of the invention the principles of the invention are implemented in an application program running on a personal computer. The application program is provided with a list of objects and the estimated sizes of the objects, which needs to be handled by the cluster of processing units. On the basis of the object sizes, the minimum number of processing units which are required for the processing can be determined. This information can form the basis for a corresponding investment decision of a customer.

It is to be noted that the present invention is not restricted to a particular type of objects. For example, data objects such as tables, arrays, lists, and trees are distributed to processing units, e.g. blades, in accordance with the principles of the present invention. For example, each one of the processing units runs a data processing task to which the respective objects are assigned.

BRIEF DESCRIPTION OF THE DRAWINGS

In the following, preferred embodiments of the invention will be described in greater detail by making reference to the drawings in which.

DETAILED DESCRIPTION

Figure 1:
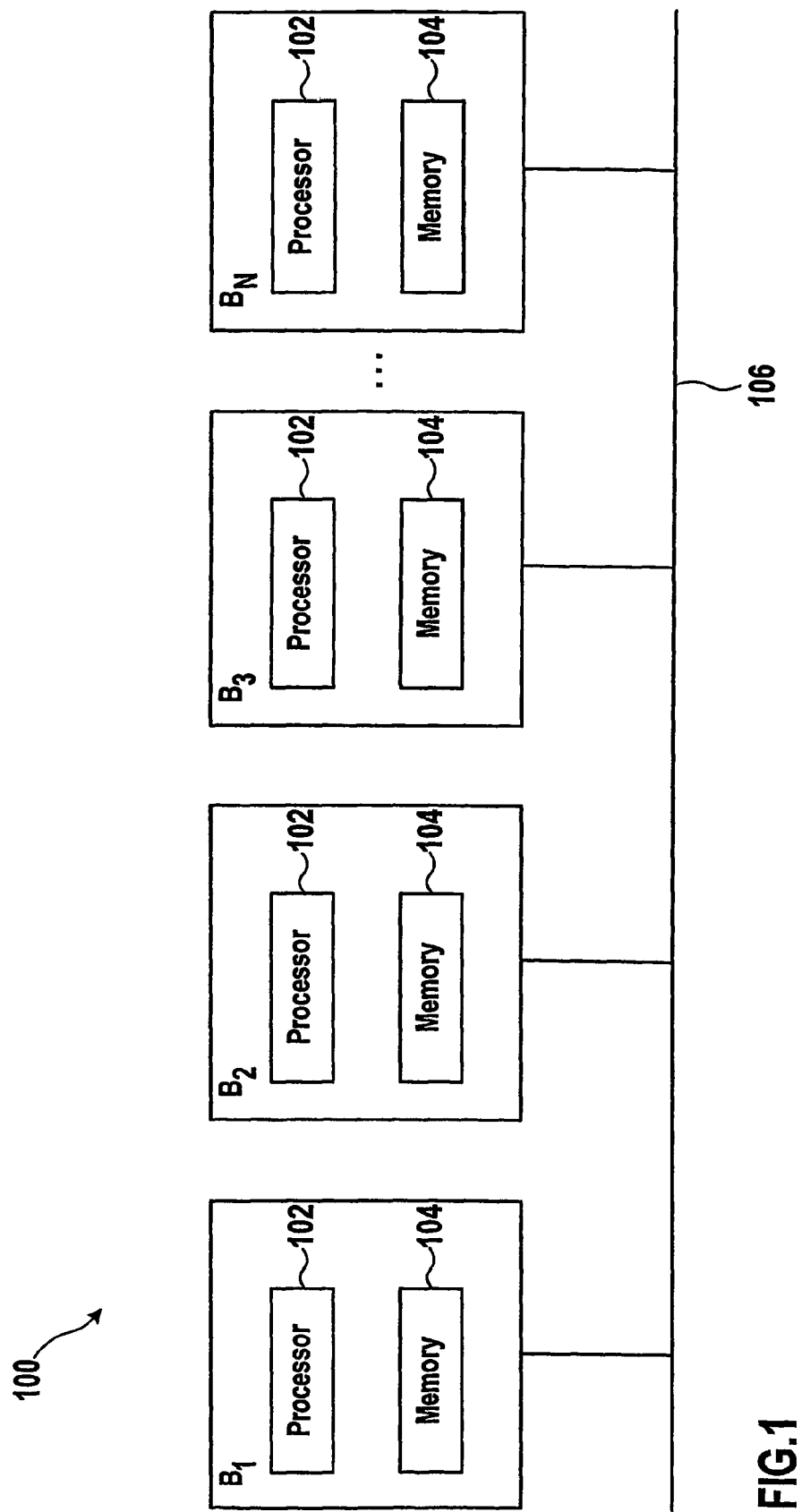
FIG. 1 is a schematic block diagram of an exemplary modular computer system, having a cluster of blades, consistent with an embodiment of the present invention.

FIG. 1 is a schematic block diagram of an exemplary modular computer system, having a cluster of blades, consistent with an embodiment of the present invention.

FIG. 1 shows cluster 100 of blades $B_1, B_2, B_3, \ldots, B_N$. Each one of the blades has processor 102 and memory 104. In the example considered here, all memories 104 have the same storage capacity. The blades are coupled by a network 106, such as a bus system. The number N of blades of cluster 100 needs to be chosen, such that a given number of M objects of varying sizes can be handled.

For example, cluster 100 implements a search engine. In this instance identical search processors run on each one of the blades. The assignment of data objects, such as index tables, to blades can be stored in a dispatcher unit (not shown in the drawing) of cluster 100. As a result, data objects are assigned to blades and data processing tasks running on the blades.

Figure 2:
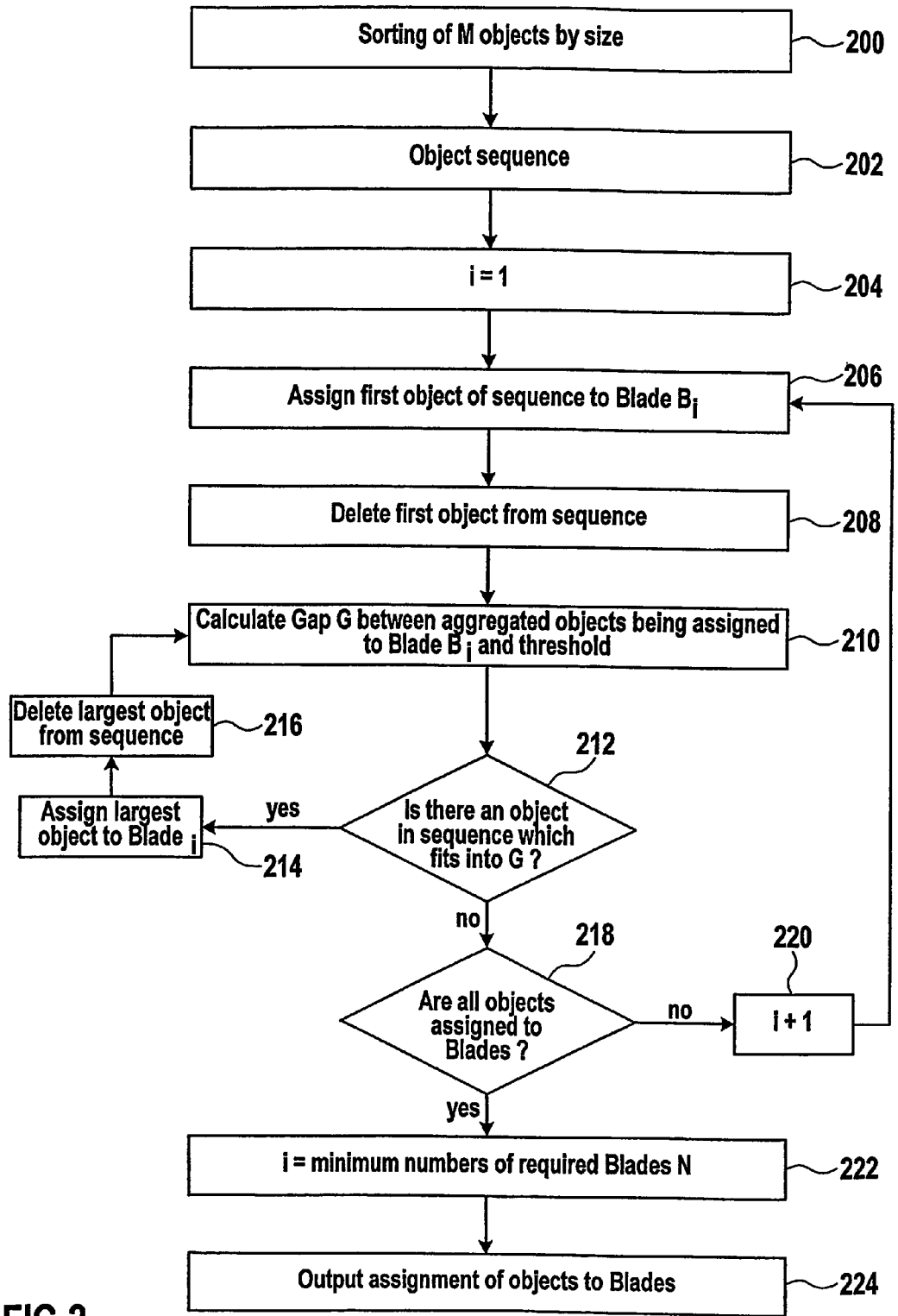
FIG. 2 is a flow diagram for an exemplary method for assigning of objects to blades and for determining the minimum number of blades, consistent with an embodiment of the present invention.

FIG. 2 is a flow diagram for an exemplary method of assigning of objects to blades and for determining the minimum number of blades, consistent with an embodiment of the present invention. FIG. 2 shows the corresponding procedure for assigning the objects to blades and thereby determine the minimum value for N.

In step 200, a sorting operation is performed in order to sort the M objects by size. The corresponding object sequence is provided in step 202. In step 204 the index i for the blades is initialized to one.

In step 206 processing of the object sequence starts in the order starting with the largest object of the sequence. The first object of the sequence, which by definition is the largest object of the sequence, is assigned to blade $B_1$ in step 206. In step 208 the first object which has been assigned to blade $B_1$ is deleted from the sequence.

In step 210 the size of the objects, which have been already assigned, to blade $B_1$ is added up and a gap G between the aggregated object size and a threshold is calculated. When the assignment procedure of FIG. 2 is carried out for the first time, the threshold is the storage capacity of one of the blades.

In step 212 it is determined whether there remains an object in the sequence, which fits into the gap G. If this is the case, the largest of these objects is assigned to the blade $B_1$ in step 214 and deleted from the sequence before the control goes back to step 210.

If there is no such object which fits into the gap G, step 218 is carried out. In step 218 it is determined whether all objects have already been assigned to blades. In other words, in step 218 it is checked whether the sequence is empty. If this is not the case the index is incremented in step 220 and the control goes back to step 206 to assign remaining objects of the sequence of the next blade $B_2$.

If the contrary is the case, the index i equals the minimum number N of blades which are required to handle the M objects. This number is outputted in step 222. The minimum number N of blades can be a basis for an investment decision for purchasing of a corresponding number of blades. Further, the assignment of objects to blades is outputted in step 224 in order to visualize the quality of the object size balancing.

Figure 3:
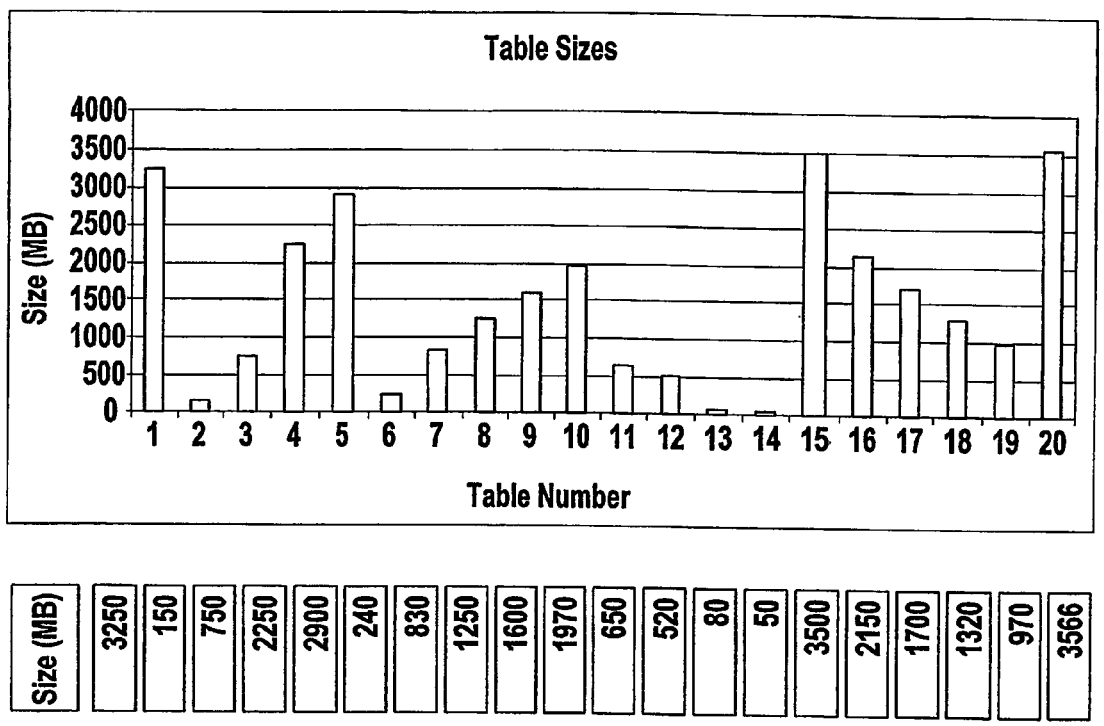
FIG. 3 is an example of tables, which need to be assigned to blades, consistent with an embodiment of the present invention.

FIG. 3 is an example of tables, which need to be assigned to blades, consistent with an embodiment of the present invention. In the example considered here, the objects are a number of twenty different tables having various sizes between 50 MB and 3566 MB as indicated in FIG. 3. For example, table 1 has a size of 3250 MB, table 2 has 250 MB, table 3 has 750 MB, etc. The table sizes can be actual table sizes or average table sizes which have been obtained by monitoring a real life data processing system. Alternatively, the table sizes are estimates for the purpose of planning cluster 100.

Figure 4:
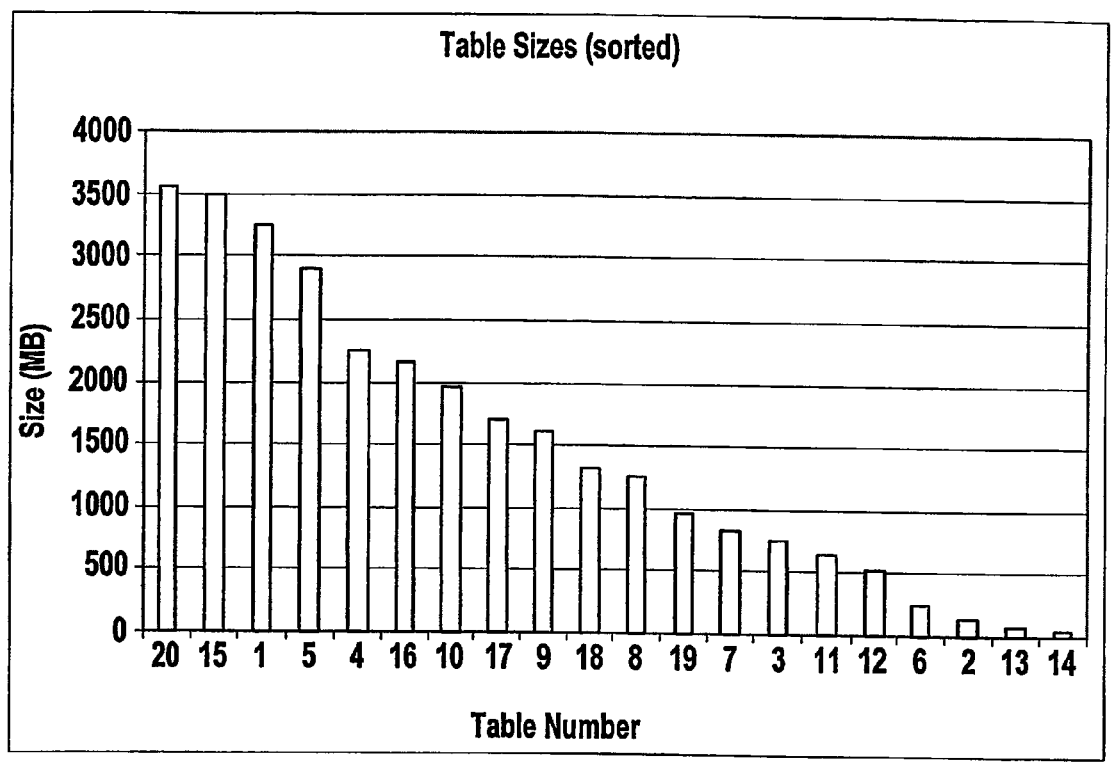
FIG. 4 illustrates the result of an exemplary sorting operation, consistent with an embodiment of the present invention.

FIG. 4 shows the result of the sorting operation performed on the tables 1 to 20 of FIG. 3 (cf. step 202 of FIG. 2), consistent with an embodiment of the present invention.

Figure 5:
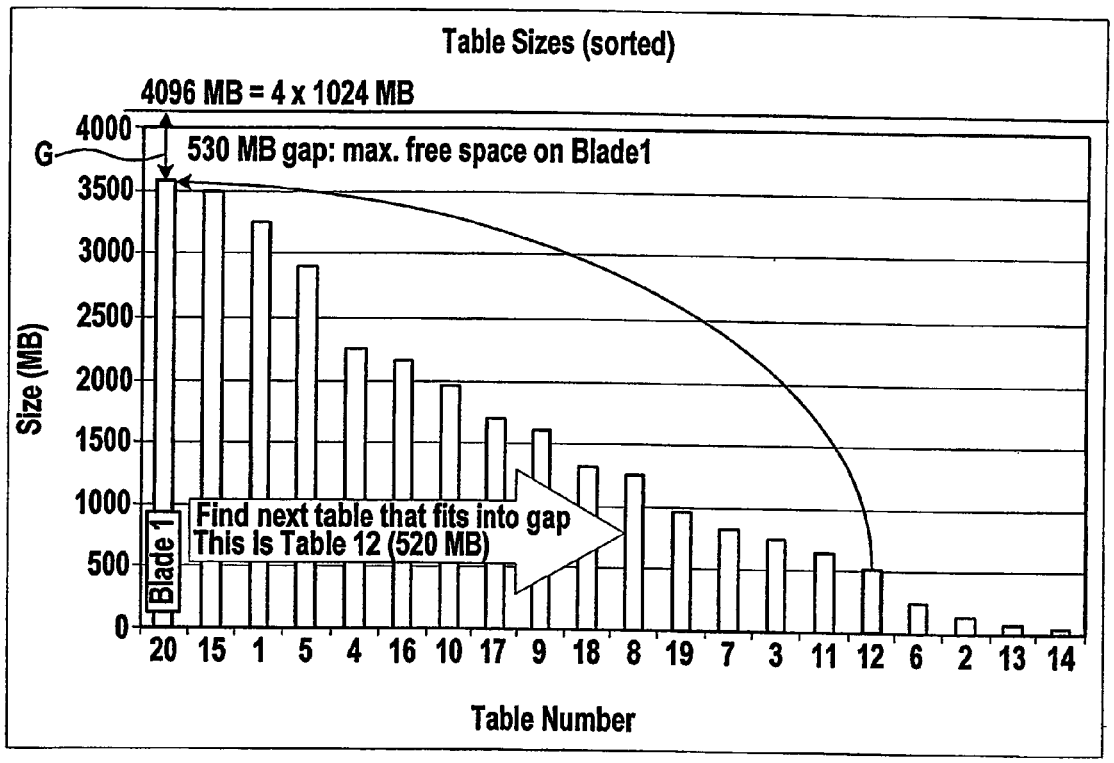
FIG. 5 illustrates an exemplary first step of assigning a table to a first one of the blades, consistent with an embodiment of the present invention.
Figure 6:
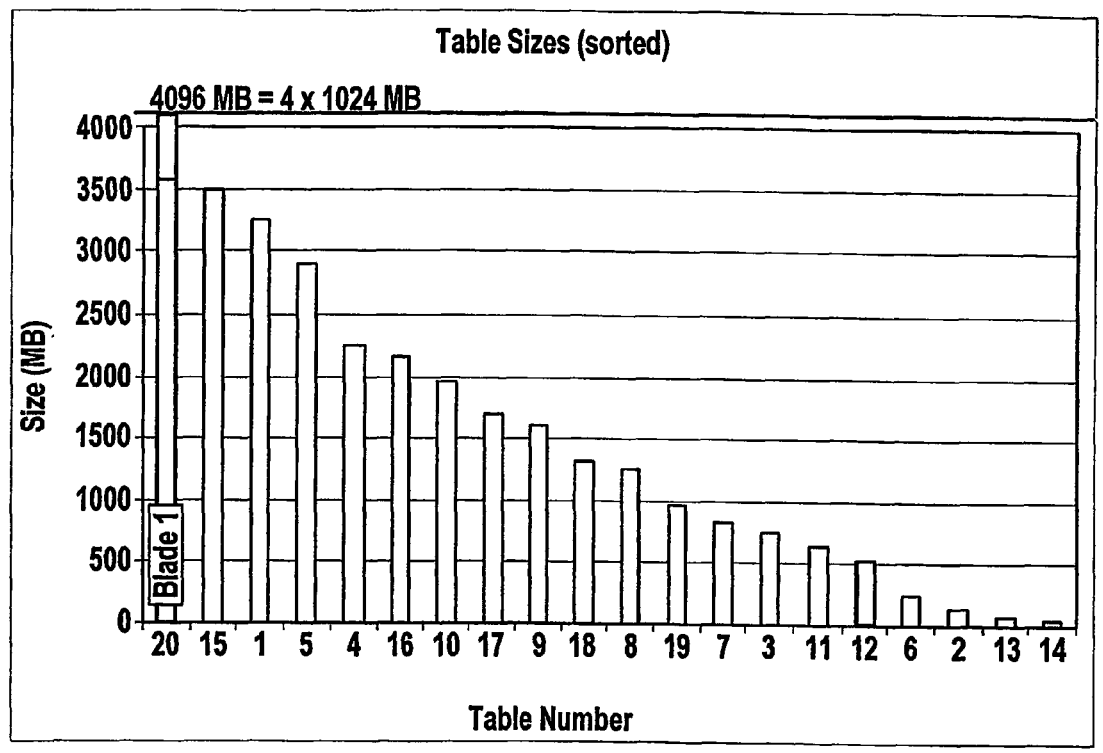
FIG. 6 illustrates an exemplary second step for assigning a table to the first blade, consistent with an embodiment of the present invention.

FIG. 5 illustrates the assignment of the first object of the sequence, i.e., the largest table 20 to blade $B_1$, consistent with an embodiment of the present invention. In the example considered here, each blade has a storage capacity of 4 GB=4096 MB of main memory. Table 20 has a size of 2566 MB, which leaves a gap G of 530 MB of remaining storage capacity (cf. step 210 of FIG. 2).

It is then determined whether there is a next object in the sequence which fits into the gap G. Table 12, which has a size of 520 MB, is the largest table which fits into the gap G. This table 12 is thus also assigned to blade 1. The aggregated size of the objects assigned to blade 1, i.e., table 20 and table 12, is 4068 MB, which leaves a gap G of 10 MB. This gap G of 10 MB is too small to accommodate even the smallest remaining object of the sequence of tables.

Because tables remain in the sequence which have not yet been assigned to a blade, the index i is incremented and the assignment procedure goes to the next blade $B_2$ (cf. steps 218 and 220 of FIG. 2). With respect to blade $B_2$ the above-explained procedure is carried out again on the basis of the unassigned tables, which remain in the sequence.

Figure 7:
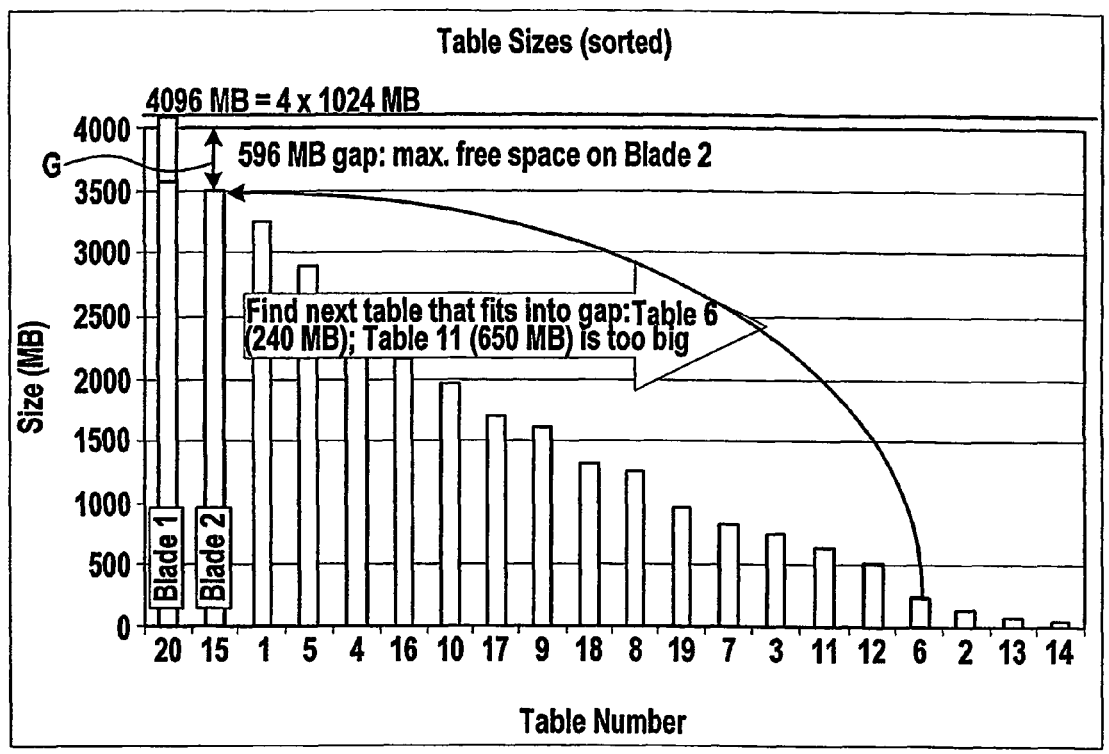
FIG. 7 shows the first assignment of a table to a second blade, consistent with an embodiment of the present invention.
Figure 8:
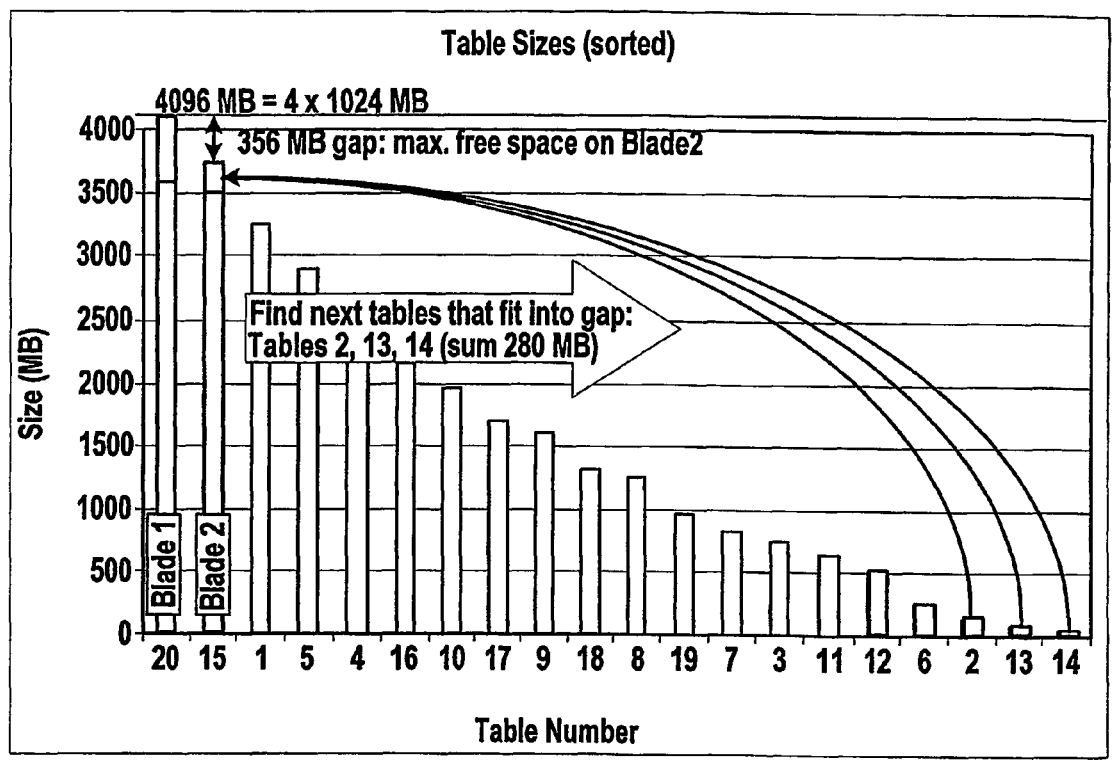
FIG. 8 shows a second assignment of a table to the second blade, consistent with an embodiment of the present invention.
Figure 9:
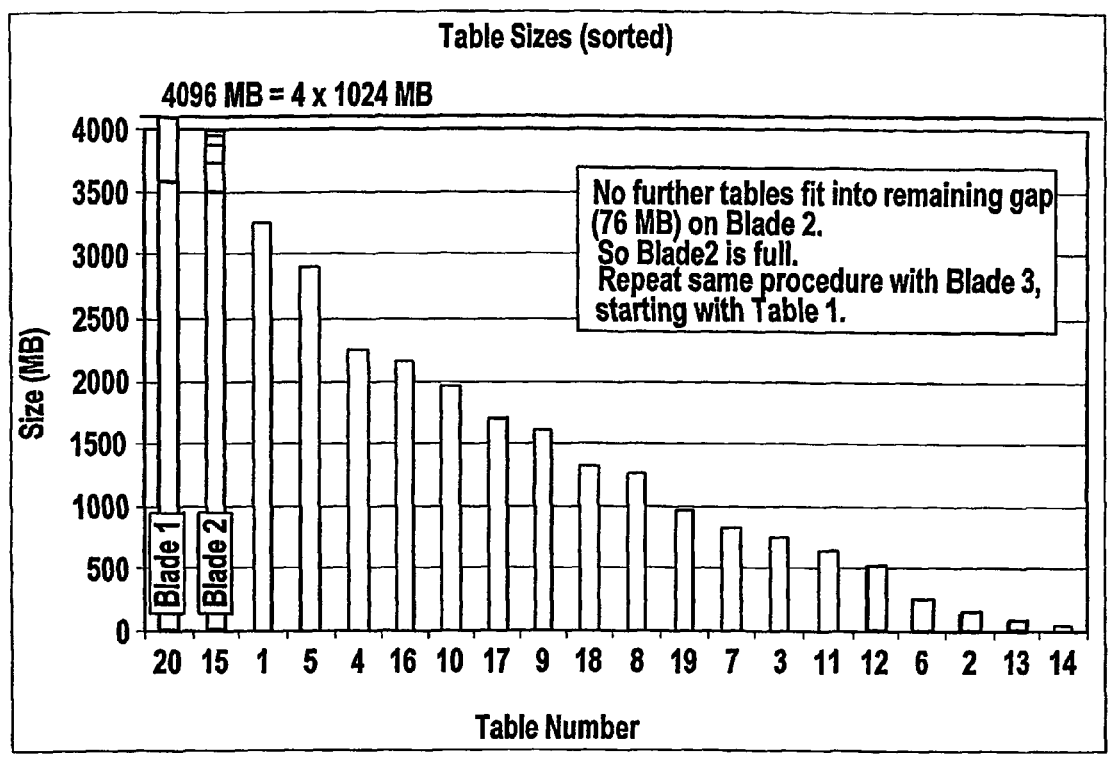
FIG. 9 shows the assignment of three further tables to the second blade, consistent with an embodiment of the present invention.

As a result, the largest remaining table of the sequence, i.e., table 15, is assigned to blade $B_2$ which leaves a gap G of 596 MB. The gap G is filled with tables 6, 2, 13 and 14 as illustrated in FIGS. 7 and 8. The resulting assignment of tables to blade $B_2$ is shown in FIG. 9.

Figure 10:
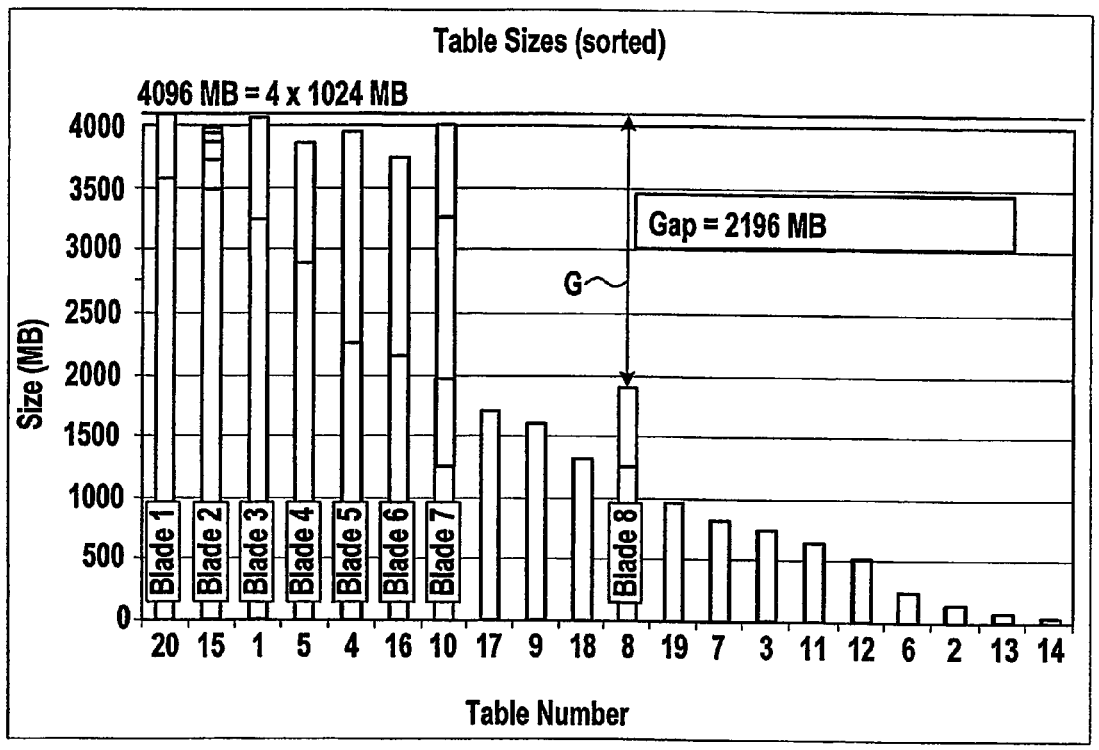
FIG. 10 shows the resulting assignment of tables to blades as a result of the assignment procedure, consistent with an embodiment of the present invention.

The aggregated size of the tables, which have been assigned to blade B2, i.e., tables 15, 6, 2, 13 and 14, leave a gap G of 76 MB which is not enough to accommodate the smallest unassigned table, i.e., table 11, of the sequence. Thus, the index i is incremented and the assignment procedure is continued for the next blade $B_3$. This process goes on until all tables of the sequence have been assigned to one blade B. The result of the assignments of tables to blades is illustrated in FIG. 10.

Figure 11:
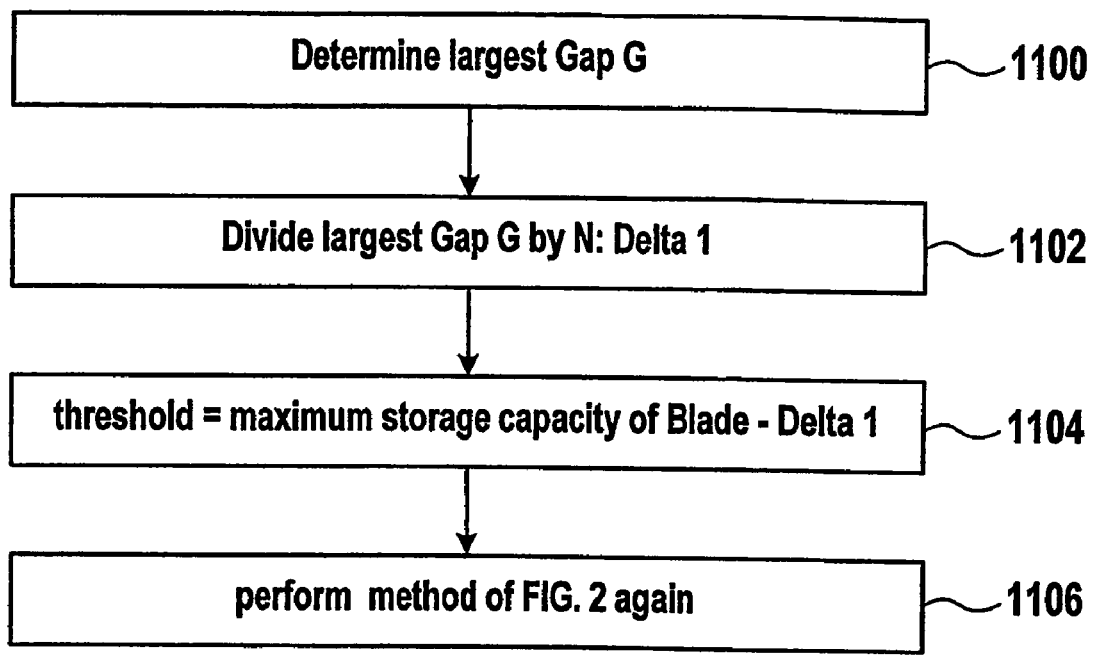
FIG. 11 illustrates an example where the procedure of FIG. 2 is performed again with a lower threshold, consistent with an embodiment of the present invention.

In addition to the assignment of tables to blades, the minimum number N of blades, which are required for handling of the given number of tables (cf. FIG. 3), is also obtained. In the example considered here, the resulting assignment of tables to the N=8 blades leaves a gap G of 2196 MB on blade 8. In order to further improve the object size balancing the method of FIG. 11 is carried out.

In step 1100 the largest gap G is determined. In the example shown in FIG. 10, this is the gap G of blade $B_8$. The other blades $B_1$ to $B_7$ have smaller gaps between the aggregated size of the tables assigned to the corresponding blade and the storage capacity of 4 GB.

In step 1102 the gap G determined in step 1100 is divided by the number N of blades. In the example of FIG. 10 this means that G=2196 MB is divided by N=8 in order to obtain the value of Delta 1=275 MB. In step 1104 a threshold is calculated by subtracting Delta 1 from the storage capacity, i.e., threshold=4096 MB−275 MB=3821 MB.

With the threshold calculated in step 1104, the method of FIG. 2 is performed again in step 1106. The resulting assignment of the objects to the blades is more evenly distributed due to the lowering of the threshold. This is illustrated by way of example in FIGS. 12 and 13 for the example of FIG. 10.

Figure 12:
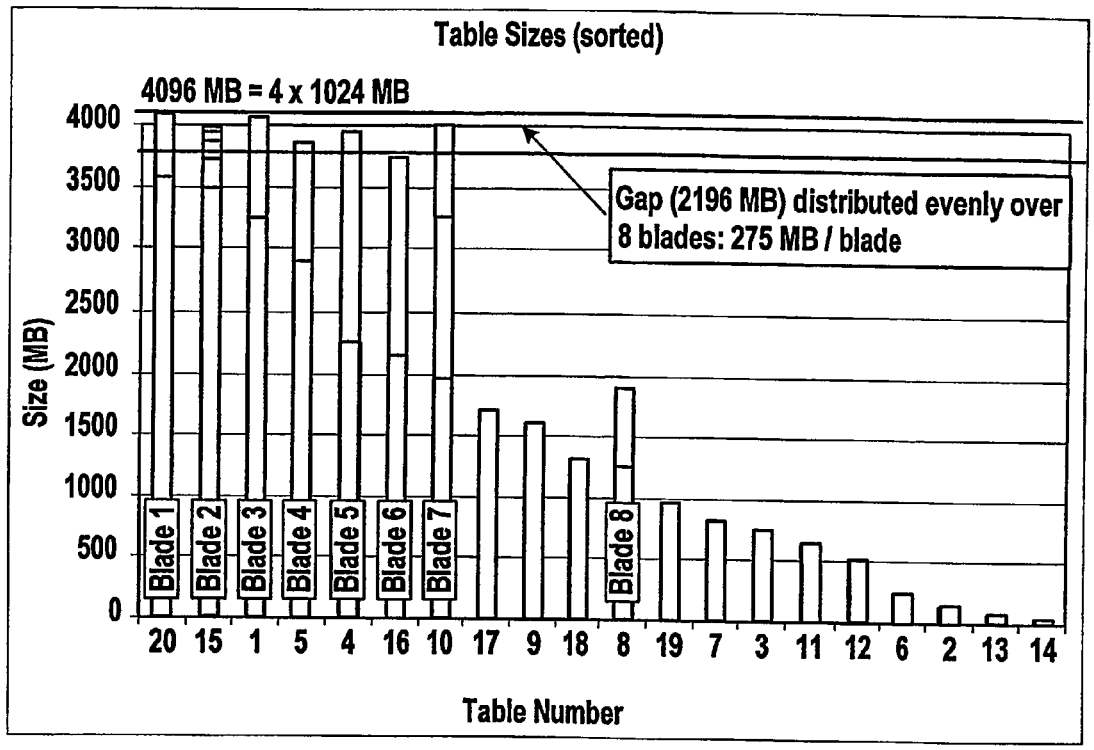
FIG. 12 illustrates the lower threshold, consistent with an embodiment of the present invention.

FIG. 12 shows the threshold T, which has been calculated in step 1104, consistent with an embodiment of the present invention. With the lowered threshold T, the assignment procedure of FIG. 2 is restarted from the beginning whereby steps 200 and 202 do not need to be performed again, if the sorted object sequence has been stored when the procedure of FIG. 2 was carried out the first time.

Figure 13:
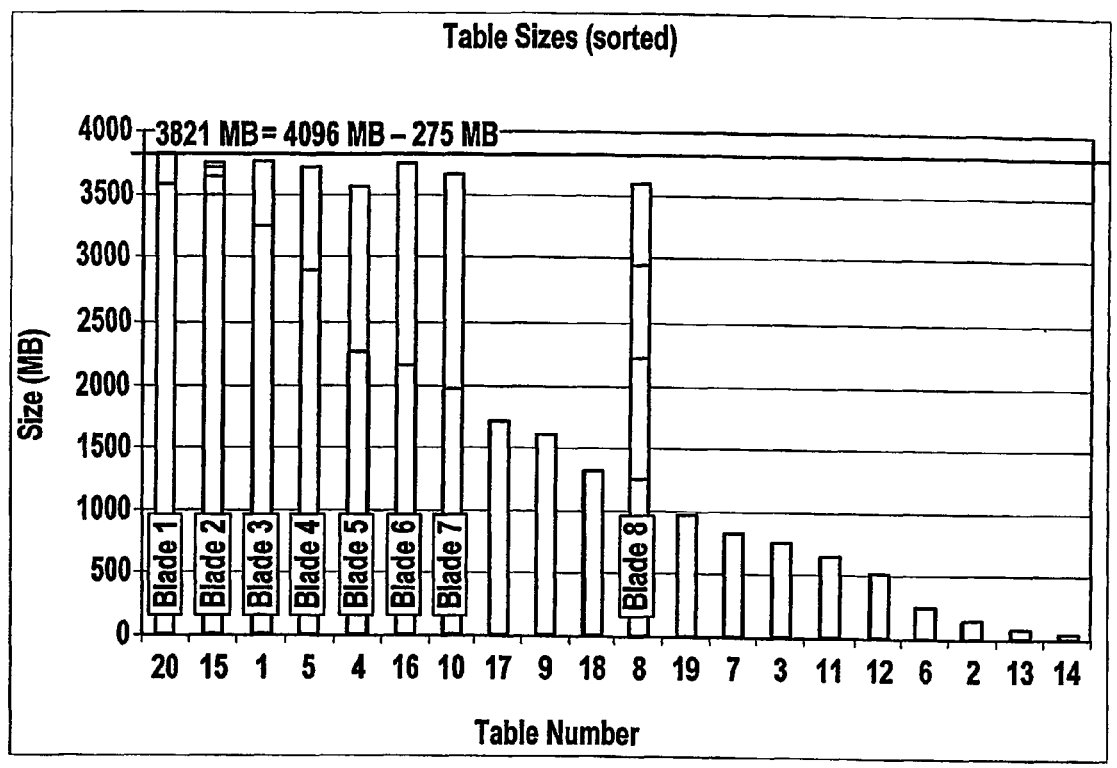
FIG. 13 illustrates the result of the renewed performance of the procedure of FIG. 2 with the lower threshold, consistent with an embodiment of the present invention.

The resulting assignment of database tables to blades after the renewed performance of the procedure of FIG. 2 with the lowered threshold T is shown in FIG. 13. As apparent from the comparison of FIGS. 10 and 13 the load is more evenly balanced between the blades after the renewed assignment procedure.

Figure 14:
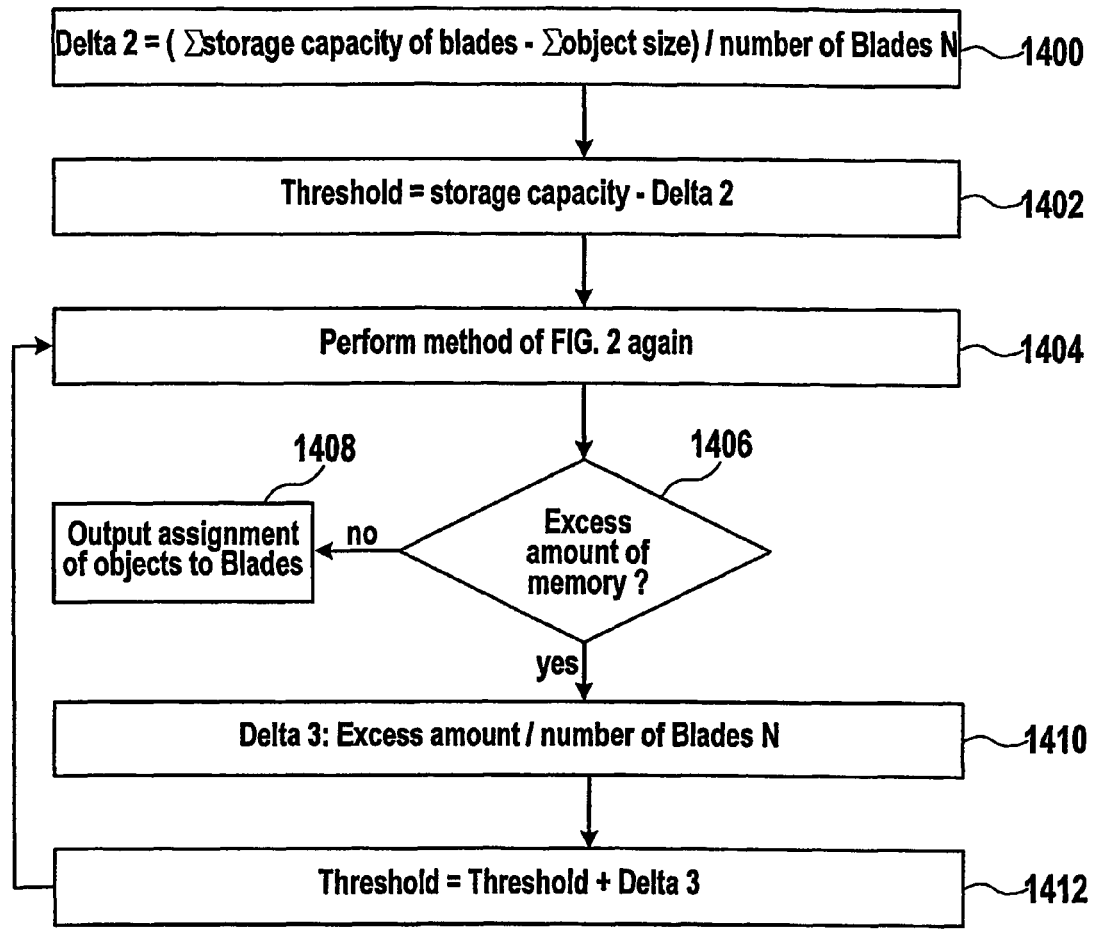
FIG. 14 illustrates an exemplary method of the invention where the threshold is varied iteratively, consistent with an embodiment of the present invention.

FIG. 14 shows an alternative approach for refining the object size balancing. In step 1400 Delta 2 is calculated by calculating the difference of the sum of the storage capacity of the blades and the sum of the object sizes of the objects to be assigned to the blades and by dividing the difference by the number of blades. In step 1402 the threshold is calculated by subtracting Delta 2 from the storage capacity. This threshold is the theoretical limit for the minimum storage capacities required on the individual blades in order to accommodate the objects if it where possible to distribute the objects with finest granularity.

In step 1404 the method of FIG. 2 is performed again with the threshold as determined in step 1402 whereby the number N is fixed, i.e., for the last blade $B_N$ which is processed. In one embodiment, the storage capacity will not be sufficient in most cases. In the resulting assignment of objects to blades, it is checked whether for the last blade, which has been processed, there is in fact an excess amount of memory requirement, which exceeds the storage capacity.

If this is not the case, the assignment of objects to blades is outputted in step 1408. If the opposite is the case, the excess amount of memory is divided by the number of blades N which provides Delta 3. In step 1412 the threshold is incremented by Delta 3 and the control goes back to step 1404.

Steps 1404, 1406, 1410 and 1412 are carried out repeatedly until there is no longer an excess amount of memory.

Figure 15:
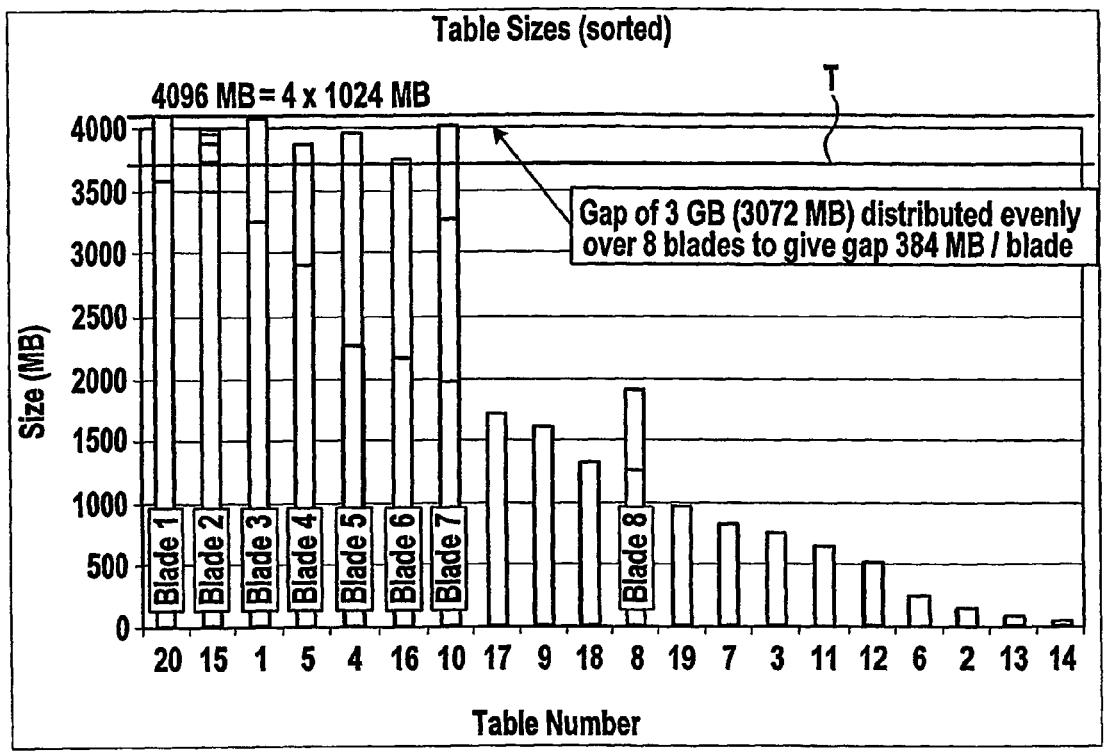
FIG. 15 illustrates the starting point of the iteration, consistent with an embodiment of the present invention.

FIG. 15 is based on the example of FIG. 10 and shows the threshold T as calculated in accordance with step 1402 of FIG. 14. In the example considered here, the difference between the sum of the storage capacities of the blades and the sum of the table sizes is 3 GB. The 3 GB are evenly distributed over the 8 blades, which provides the threshold T.

If there is no excess amount of memory as a result of one iteration but a gap between the aggregated size of objects, which have been assigned to the last blade N, the procedure is continued in order to reduce the gap. This can be done by dividing the gap by the number of blades N and distributing the result over the blades by increasing the threshold correspondingly. The gap is calculated as follows: threshold T−sum of the sizes of the objects assigned to blade N.

In this instance the process is stopped if (i) there is no significant change from one iteration to the next (ii) the iterations toggle between different results, (iii) the standard deviation of the distribution of the objects does not improve or (iv) a maximum number of iterations has been reached.

Figure 16:
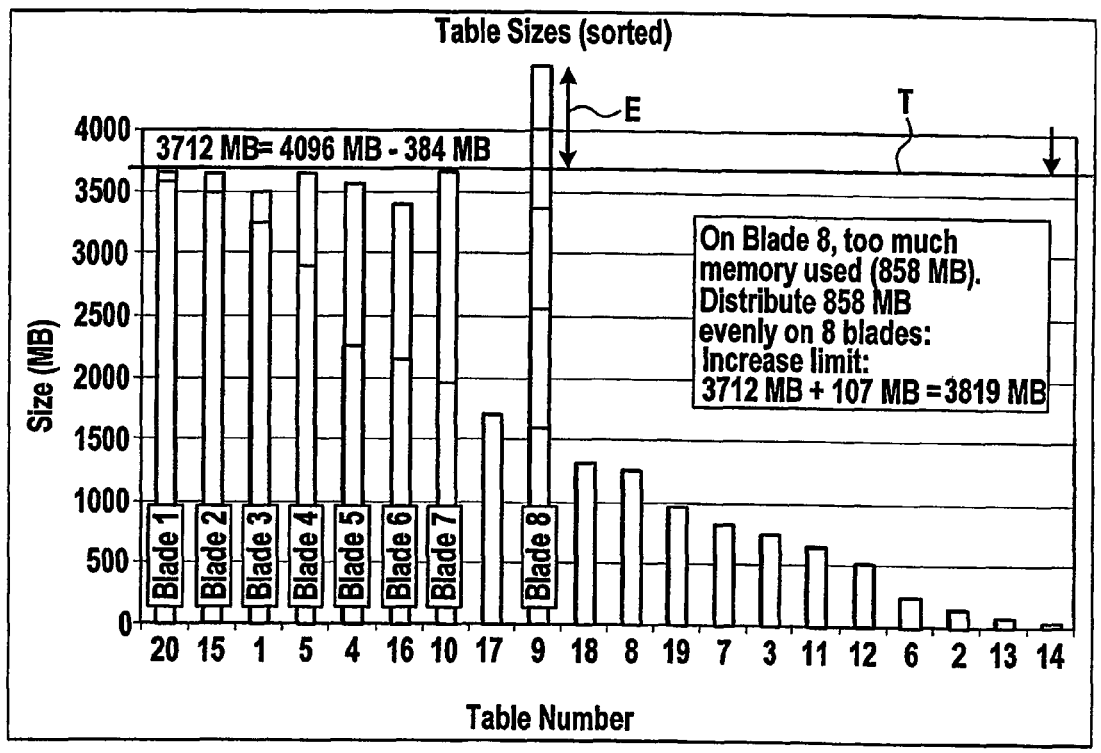
FIG. 16 illustrates the result of the first iteration, consistent with an embodiment of the present invention.
Figure 17:
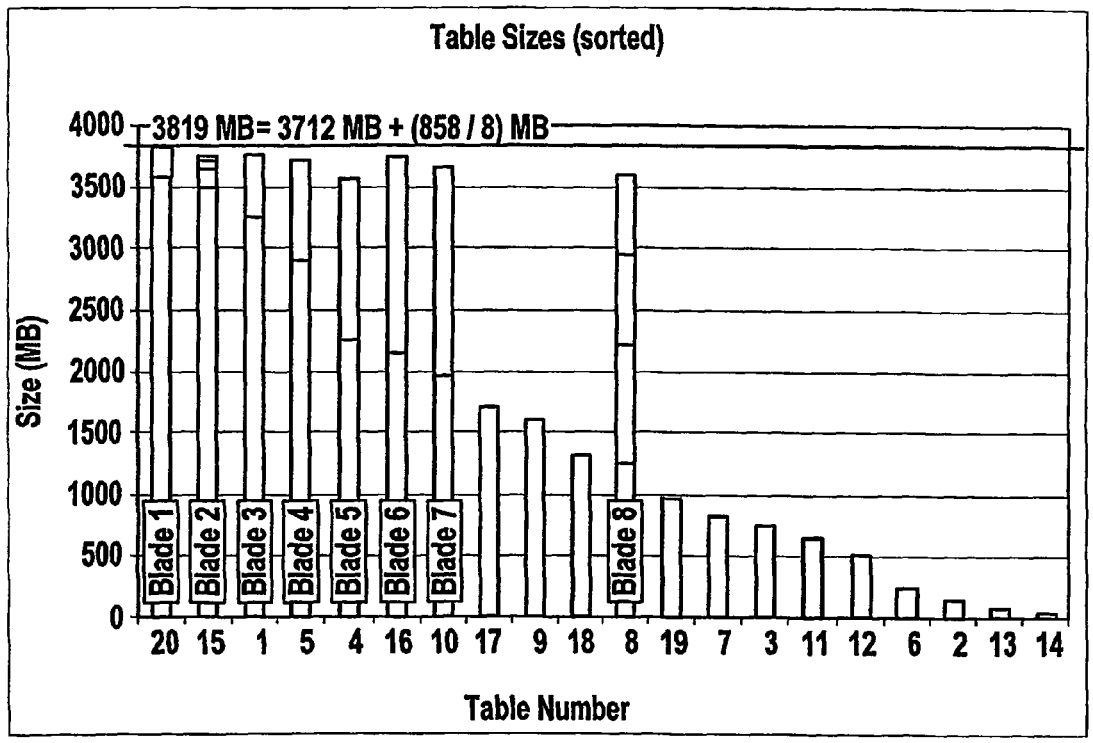
FIG. 17 illustrates the resulting assignment of objects to the minimum number of blades after completion of the procedure of FIG. 14, consistent with an embodiment of the present invention.

FIG. 16 shows the result of the assignment procedure of FIG. 2, which has been performed with the threshold T as determined in step 1402, consistent with an embodiment of the present invention. As a result of the assignment procedure, there is an excess amount of memory E for blade $B_8$. In the example considered here, the excess memory amount E is 858 MB. In accordance with step 1410 the excess amount E is divided by the number of blades N=8. In accordance with step 1412 the resulting amount of memory Delta 3=107 MB is added to the threshold. Next the assignment method of FIG. 2 is carried out again with the increased threshold, which provides the result as shown in FIG. 17.

Figure 18:
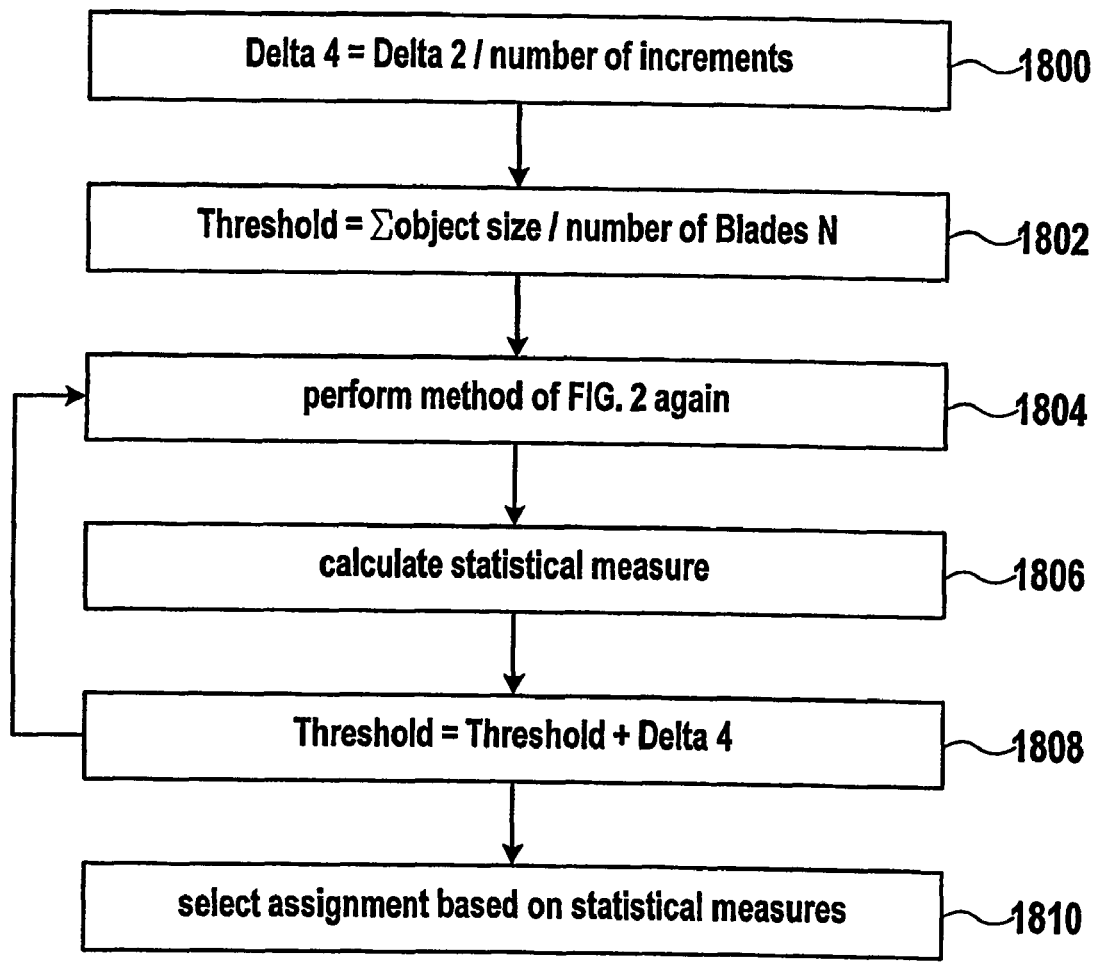
FIG. 18 illustrates a further example where the threshold is varied in predetermined steps, consistent with an embodiment of the present invention.

FIG. 18 shows a further alternative for refinement of the object size balancing, consistent with an embodiment of the present invention. First the step 1400 of the method of FIG. 14 is carried out in order to calculate Delta 2. Delta 2 is equivalent to the gap between the theoretical limit, i.e., the threshold as calculated in step 1402 of the method of FIG. 14, and the storage capacity of a blade.

This gap is scanned by a stepwise variation of the threshold in order to identify an assignment of objects to blades which is balanced. The number of steps, i.e. the number of increments of the threshold, can be predefined or is user-selectable.

In step 1800 Delta 2 is divided by the number of increments, which provides Delta 4. In step 1802 the threshold is calculated by dividing the sum of the object sizes by the number of blades N. With this threshold the assignment method of FIG. 2 is performed again in step 1804.

In step 1806 a statistical measure is calculated as a quality measure for the assignment of objects to blades obtained as a result of step 1804. For example, the standard deviation of the aggregated sizes of objects assigned to each one of the blades is calculated.

In other words, for each blade the total of the sizes of the objects, which have been assigned to the blade, is calculated. This provides one total size per blade. Next the standard deviation is calculated for the total sizes.

In step 1808 the threshold is incremented by Delta 4 and the control goes back to step 1804. This procedure is continued until the threshold has reached the storage capacity, i.e. the upper limit.

In step 1810 one of the assignments obtained as a result of step 1804 is selected on the basis of the overall statistical measure. For example, the assignment having the lowest standard deviation is selected.

Figure 19:
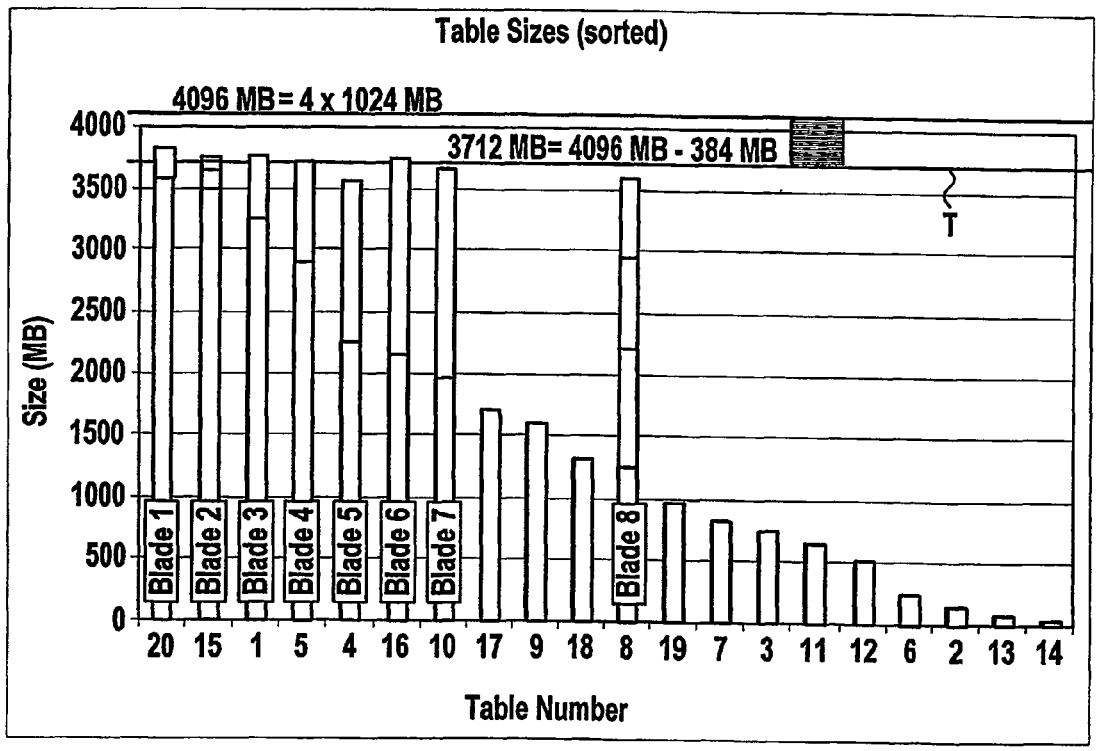
FIG. 19 illustrates the discrete continuum in which the threshold is varied and the result of the assignment procedure, consistent with an embodiment of the present invention.

FIG. 19 illustrates this method with respect to the example shown in FIG. 10, consistent with an embodiment of the present invention. The threshold T of 3712 MB is obtained by the calculation of step 1802. From there the threshold is stepwise increased in increments of Delta 4, which is Delta 2=384 MB divided by the number of increments. For example, the number of increments is 100. For each assignment procedure the standard deviation of the table sizes assigned to blades is calculated for selection of one of the assignments. The standard deviations are preferably calculated only for those assignments which fit onto the minimum number of blades.

Figure 20:
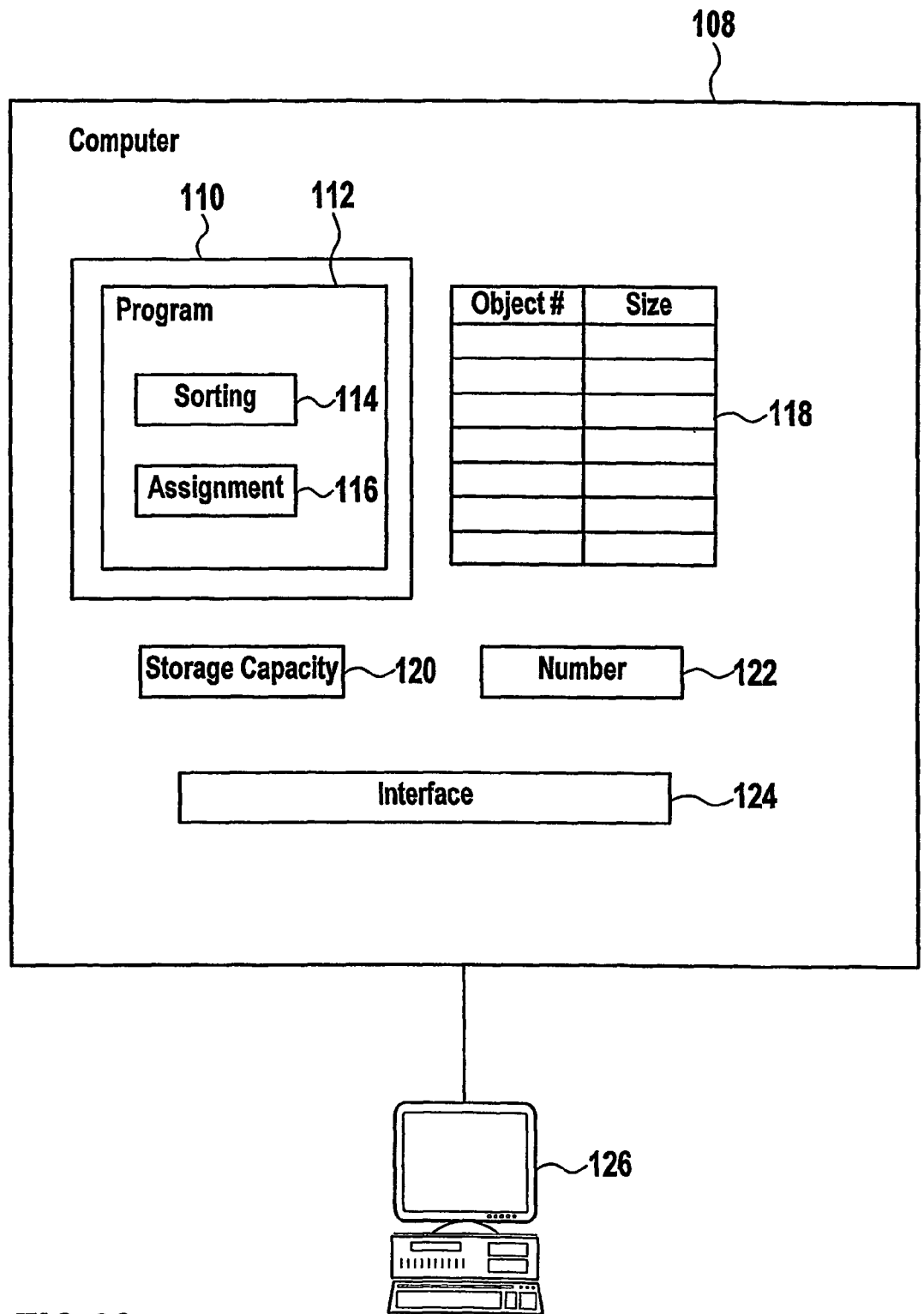
FIG. 20 illustrates an exemplary computer system performing the assignment of objects to blades.

FIG. 20 shows a computer 108, which has processor 110 for running program 112. Program 112 may be a computer program product and has module 114 for sorting of objects by size and module 116 for assigning of objects to blades.

Further computer 108 has storage 118 for storing a table listing the objects and object sizes to be assigned to blades, storage 120 for storage of a storage capacity value of the blades and storage 122 for storing of the number of blades. Further computer 108 has interface 124 for coupling to workstation 126.

In operation, the table with the object names/numbers and object sizes is entered via interface 124 and stored in storage 118. This corresponds to the information shown in FIG. 3.

Further a storage capacity value for the storage capacity of each individual blade is entered via interface 124 and stored in storage 120. In the example considered here, the storage capacity value is 4 GB.

Program 112 may then be invoked. Program 112 sorts the table of storage 118 by size to provide a sequence of objects (cf. FIG. 4). Next module 116 performs the method of FIG. 2 in order to determine the minimum number of required blades. This minimum number is stored in storage 122 and is outputted via user interface 124. This number can be a basis for a users investment decision for purchasing the number of blades to realize a data processing system being capable of handling the objects as listed in the table.

In addition, module 116 can perform the methods of FIG. 11, FIG. 14 and/or FIG. 18 for refinement of the object size balancing.

Alternatively, computer 108 is one of the blades. In this instance computer 108 can dynamically change the assignment of objects to blades when the object size changes. This way frequent swapping operations for swapping objects between blades can be prevented.

The invention claimed is:

1. A method of assigning objects to processing units of a cluster of processing units, the processing units having storage capacities, the method being executed by a computer and comprising the steps of:

storing, in a storage device of the computer, the objects and object sizes;

sorting of the objects by size to provide a sequence of objects;

assigning the objects to the processing units starting with the largest object in the sequence until a remaining storage capacity of one of the processing units is below the smallest object of the sequence, wherein the remaining storage capacity is determined by a difference between a storage capacity of the one processing unit and an aggregated size of objects being assigned to the one processing unit;

deleting, from the sequence, the objects which have been assigned;

determining, after assignment of the sequence of objects to the processing units, a processing unit having a largest gap based on the aggregated size of the assigned objects and remaining storage capacities of the processing units;

dividing the largest gap with a minimum number of the processing units to which the objects have been assigned;

calculating a first threshold value by subtracting a result of the division from a storage capacity of the processing unit having the largest gap; and reassigning the objects to the processing units starting with the largest object in the sequence until a remaining storage capacity of one the processing units is below the smallest object of the sequence, wherein during reassignment the remaining storage capacity is the difference between an aggregated size of the objects being reassigned and the first threshold.

2. The method of claim 1, wherein the steps of assigning of the objects and deleting of the objects after assignment are carried out repeatedly until the sequence is empty which provides the minimum number of the processing units required for the assignment.

3. The method of claim 1, further comprising the steps of:
stepwise varying a second threshold between a first limit and a second limit;
reassigning, based on the second threshold, at least one of the objects to one of the processing units starting with the largest object in the sequence until a remaining storage capacity of the processing unit is below the smallest object of the sequence, wherein the remaining storage capacity, during reassignment based on the second threshold value, is the difference between the aggregated size of the objects being reassigned and the second threshold;
deleting, from the sequence, the objects which are reassigned to a processing unit based on the second threshold value, wherein a statistical measure is calculated for the reassignment of objects; and
selecting of one of the reassignments of the objects to processing units based on the statistical measure.

4. The method of claim 3, wherein the first limit is the aggregated size of the objects divided by the minimum number of processing units, and wherein the second limit is a storage capacity of one of the processing units.

5. The method of claim 3, wherein the statistical measure is calculated by calculation of the standard deviation or the variance of the totals of the sizes of objects assigned to one processing unit.

6. The method of claim 1, wherein the objects are database tables of various sizes.

7. The method of claim 1, wherein one of the processing units is a blade or a blade server.

8. A computer program product tangibly embodied in a computer-readable storage medium and comprising instructions which, when executed on a processor, causes the processor to perform a method for assigning objects to processing units of a cluster of processing units, the processing units having storage capacities, the method comprising the steps of:
sorting of the objects by size to provide a sequence of objects;
assigning the objects to the processing units starting with the largest object in the sequence until a remaining storage capacity of one of the processing units is below the smallest object of the sequence, wherein the remaining storage capacity is determined by a difference between a storage capacity of the one processing unit and an aggregated size of objects being assigned to the one processing unit;
deleting, from the sequence, the objects which have been assigned;
determining, after assignment of the sequence of objects to the processing units, a processing unit having a largest gap based on the aggregated size of the assigned objects and remaining storage capacities of the processing units;
dividing the largest gap with a minimum number of the processing units to which the objects have been assigned;
calculating a first threshold value by subtracting a result of the division from a storage capacity of the processing unit having the largest gap; and
reassigning the objects to the processing units starting with the largest object in the sequence until a remaining storage capacity of one the processing units is below the smallest object of the sequence, wherein during reassignment the remaining storage capacity is the difference between an aggregated size of the objects being reassigned and the first threshold.

9. The computer program product of claim 8, the program means being adapted to repeatedly carry out:
assigning of the objects to the processing units starting with the largest object in the sequence until a remaining storage capacity of one of the processing units is below the smallest object of the sequence; and
deleting the objects which have been assigned from the sequence until the sequence is empty; and
outputting the minimum number of the processing units, which are required for the assignment of the objects.

10. The computer program product of claim 8, the program means being adapted to perform the steps of:
stepwise varying a second threshold between a first limit and a second limit;
reassigning, based on the second threshold, at least one of the objects to one of the processing units starting with the largest object in the sequence until a remaining storage capacity of the processing unit is below the smallest object of the sequence, wherein the remaining storage capacity, during reassignment based on the second threshold value, is the difference between the aggregated size of the objects being reassigned and the second threshold;
deleting, from the sequence, the objects which are reassigned to a processing unit based on the second threshold value, wherein a statistical measure is calculated for the reassignment of objects; and
selecting of one of the reassignments of the objects to processing units based on the statistical measure.

11. A data processing system for assigning objects to processing units of a cluster of processing units, the processing units having storage capacities and the objects having sizes, the data processing system comprising:
means for storing the objects and the object sizes;
means for sorting of the objects by size to provide a sequence of objects;
means for assigning the objects to a processing units starting with the largest object in the sequence until a remaining storage capacity of one of the processing units is below the smallest object of the sequence, wherein the remaining storage capacity is determined by a difference between a storage capacity of the one processing unit and an aggregated size of objects being assigned to the one processing unit;
means for deleting, from the sequence, objects which have been assigned;
means for determining, after assignment of the sequence of objects to the processing units, a processing unit having a largest gap based on the aggregated size of the assigned objects and remaining storage capacities of the processing units;

means for dividing the largest gap with a minimum number of the processing units to which the objects have been assigned;

means for calculating a first threshold value by subtracting a result of the division from a storage capacity of the processing unit having the largest gap; and means for the objects to the processing units starting with the largest object in the sequence until a remaining storage capacity of one the processing units is below the smallest object of the sequence, wherein during reassignment the remaining storage capacity is the difference between an aggregated size of the objects being reassigned and the first threshold.

12. The data processing system of claim 11, each processing unit being a single-board computer having a bus interface to a bus system that couples the single-board computers.

13. A method of assigning objects to processing units of a cluster of processing units, the processing units having storage capacities, the method being executed by a computer and comprising the steps of:

storing, in a storage device of the computer, the objects and object sizes;

sorting of the objects by size to provide a sequence of objects;

assigning the objects to the processing units starting with the largest object in the sequence until a remaining storage capacity of one of the processing units is below the smallest object of the sequence, wherein the remaining storage capacity is determined by a difference between a storage capacity of the one processing unit and an aggregated size of objects being assigned to the one processing unit;

deleting, from the sequence, the objects which have been assigned;

determining a total of the sizes of the objects;

determining a difference between a total of storage capacities of a minimum number of processing units and the total of the sizes of the objects;

subtracting the difference divided by the minimum number of processing units from the storage capacity to provide a threshold value;

reassigning, based on the threshold value, the objects to the processing units starting with the largest object in the sequence until a remaining storage capacity of one of the processing units is below the smallest object of the sequence, wherein the remaining storage capacity, during reassignment, is determined by the difference between the aggregated size of the objects being reassigned to the one processing unit and the threshold value; and deleting the objects which are reassigned from the sequence; and dividing an excess amount by the minimum number of processing units and increasing the threshold value by the result of the division, when after the deleting of the reassigned objects there is an excess amount of memory requirement for one of the processing units which surpasses the storage capacity of the one processing unit, wherein the steps of deleting the objects, dividing the excess amount by the minimum number of processing units, and increasing the threshold value are performed repeatedly until there is no such excess amount.

14. The method of claim 13, wherein when there is no such excess amount but a gap, dividing the gap by the minimum number of processing units and decreasing the threshold value by the result of the division.

15. The method of claim 13, wherein one of the processing units is a blade or a blade server.

16. A computer program product tangibly embodied in a computer-readable storage medium and comprising instructions which, when executed on a processor, causes the processor to perform a method for assigning objects to processing units of a cluster of processing units, the processing units having storage capacities, the method comprising the steps of:

sorting of the objects by size to provide a sequence of objects;

assigning the objects to the processing units starting with the largest object in the sequence until a remaining storage capacity of one of the processing units is below the smallest object of the sequence, wherein the remaining storage capacity is determined by a difference between a storage capacity of the one processing unit and an aggregated size of objects being assigned to the one processing unit;

deleting, from the sequence, the objects which have been assigned;

determining a total of the sizes of the objects;

determining a difference between a total of storage capacities of a minimum number of processing units and the total of the sizes of the objects;

subtracting the difference divided by the minimum number of processing units from the storage capacity to provide a threshold value;

reassigning, based on the threshold value, the objects to the processing units starting with the largest object in the sequence until a remaining storage capacity of one of the processing units is below the smallest object of the sequence, wherein the remaining storage capacity, during reassignment, is determined by the difference between the aggregated size of the objects being reassigned to the one processing unit and the threshold value;

deleting the objects which are reassigned from the sequence; and dividing an excess amount by the minimum number of processing units and increasing the threshold value by the result of the division, when after the deleting of the reassigned objects there is an excess amount of memory requirement for one of the processing units which surpasses the storage capacity of the one processing unit, wherein the steps of deleting the objects, dividing the excess amount by the minimum number of processing units, and increasing the threshold value are performed repeatedly until there is no such excess amount.

17. The computer program product of claim 16, wherein one of the processing units is a blade or a blade server.

18. A data processing system for determining a minimum number of processing units of a cluster of processing units for a given number of objects having various sizes, the data processing system comprising:

means for storing the objects and the object sizes;

means for sorting of the objects by size to provide a sequence of objects;

means for assigning the objects to the processing units starting with the largest object in the sequence until a remaining storage capacity of one of the processing units is below the smallest object of the sequence, wherein the remaining storage capacity is determined by a difference between a storage capacity of the one processing unit and an aggregated size of objects being assigned to the one processing unit;

means for deleting, from the sequence, the objects which have been assigned;

means for determining a total of the sizes of the objects;

means for determining a difference between a total of storage capacities of a minimum number of processing units and the total of the sizes of the objects; and means for subtracting the difference divided by the minimum number of processing units from the storage capacity to provide a threshold value;

means for reassigning, based on the threshold value, the objects to the processing units starting with the largest object in the sequence until a remaining storage capacity of one of the processing units is below the smallest object of the sequence, wherein the remaining storage capacity, during reassignment, is determined by the difference between the aggregated size of the objects being reassigned to the one processing unit and the threshold value;

means for deleting the objects which are reassigned from the sequence; and means for dividing an excess amount by the minimum number of processing units and increasing the threshold value by the result of the division, when after the deleting of the reassigned objects there is an excess amount of memory requirement for one of the processing units which surpasses the storage capacity of the one processing unit, wherein the steps of deleting the objects, dividing the excess amount by the minimum number of processing units, and increasing the threshold value are performed repeatedly until there is no such excess amount.

19. The data processing system of claim 18, wherein one of the processing units is a blade or a blade server.

* * * * *